United States Patent [19]
Houston et al.

[11] 3,986,463
[45] Oct. 19, 1976

[54] AGRICULTURAL IMPLEMENT

[75] Inventors: Richard K. Houston, Kansas City, Mo.; Alvin E. Ratzlaff, Orienta, Okla.; Max W. Cruikshank, Cedar Falls, Iowa

[73] Assignee: Agrecology, Inc., Kansas City, Mo.

[22] Filed: Apr. 18, 1975

[21] Appl. No.: 569,272

Related U.S. Application Data

[60] Division of Ser. No. 386,307, Aug. 7, 1973, Pat. No. 3,880,099, which is a continuation-in-part of Ser. No. 288,573, Sept. 13, 1972, abandoned.

[52] U.S. Cl. ........................... 111/1; 111/10; 47/9; 47/58; 56/13.1; 56/13.3
[51] Int. Cl.² ............................ A01C 5/00
[58] Field of Search .............. 111/1, 10; 47/58, 9; 56/13.3, 13.1, 12.8, 30, 27.5

[56] References Cited
UNITED STATES PATENTS

| | | | |
|---|---|---|---|
| 2,748,535 | 6/1956 | Skromme et al. | 47/9 |
| 2,936,838 | 5/1960 | Bonomo et al. | 111/1 X |
| 2,949,871 | 8/1960 | Finn | 111/1 |
| 3,105,339 | 10/1963 | Pagel et al. | 56/13.1 |
| 3,159,958 | 12/1964 | Mathews | 56/13.3 |
| 3,530,652 | 9/1970 | Long et al. | 56/12.8 |
| 3,556,026 | 1/1971 | Houston | 47/58 X |

*Primary Examiner*—Stephen C. Pellegrino
*Attorney, Agent, or Firm*—Lowe, Kokjer, Kircher, Wharton & Bowman

[57] ABSTRACT

A method and apparatus is provided to conserve moisture for growing crops. An over-the-field carrier is provided with harvesting means for severing a prior year's crop stubble from a field. The leaf and stalk material are separated and the leaf material is retained for feed while the stalk material is returned to the field for building up the organic matter in the soil and also controlling erosion. Cultivating means may be incorporated on the carrier to work the soil and enhance the effectiveness of the recycled stalk material. In areas where sufficient moisture is a major concern slotting apparatus is incorporated onto the carrier to form a longitudinally and vertically extending slot through the field. This slot is then filled with the separated stalk material which is effective in retaining water entering the slot. An inclined and compacted watershed area is formed on either side of the slot by grader blades and rollers. This serves to direct runoff water into the slot where it will be retained for use by growing plants.

12 Claims, 13 Drawing Figures

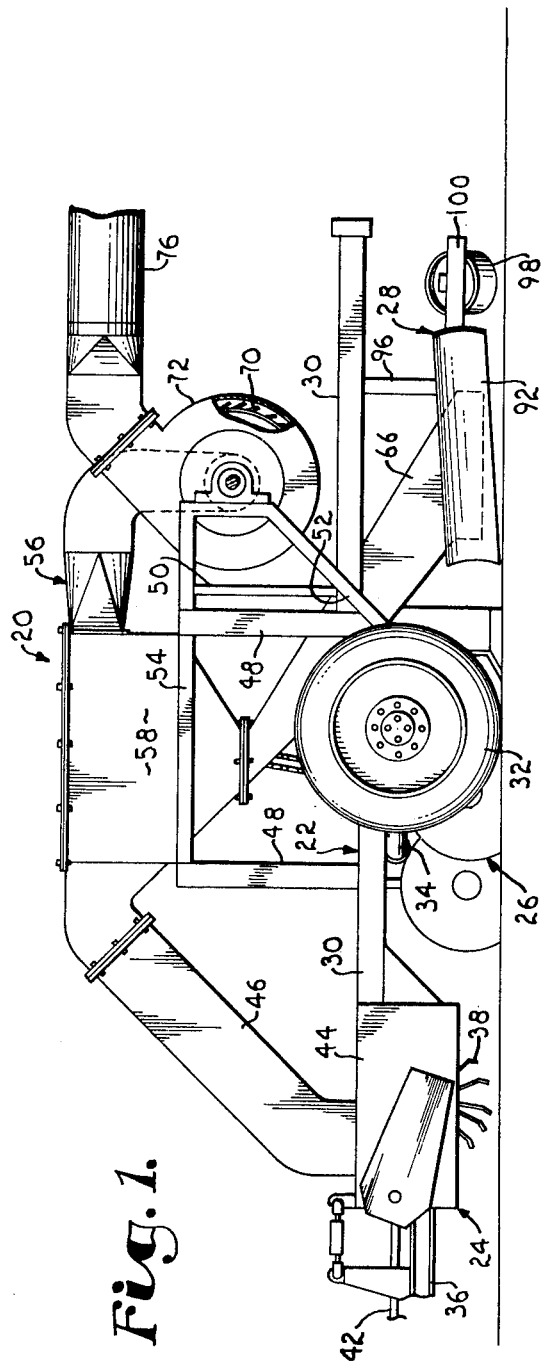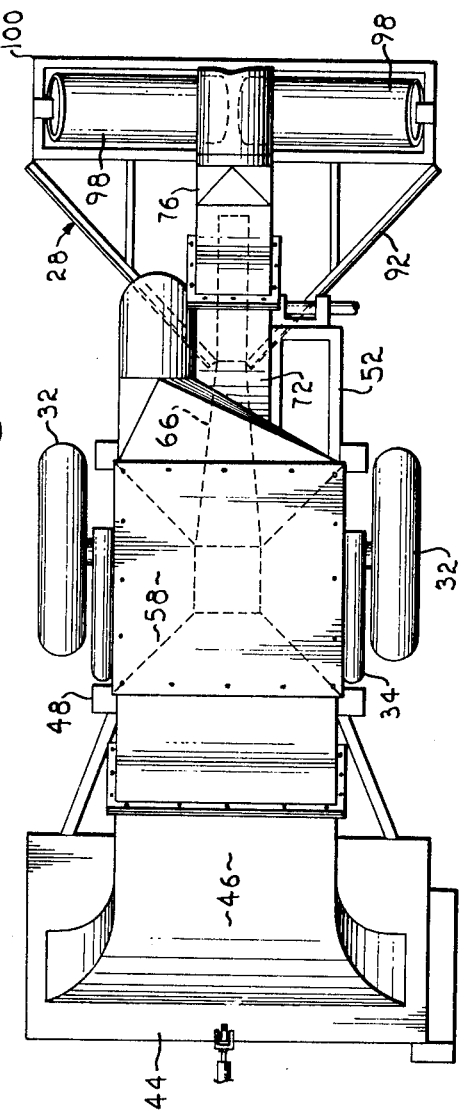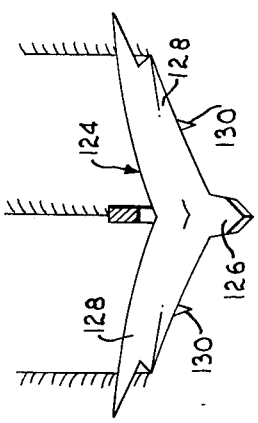

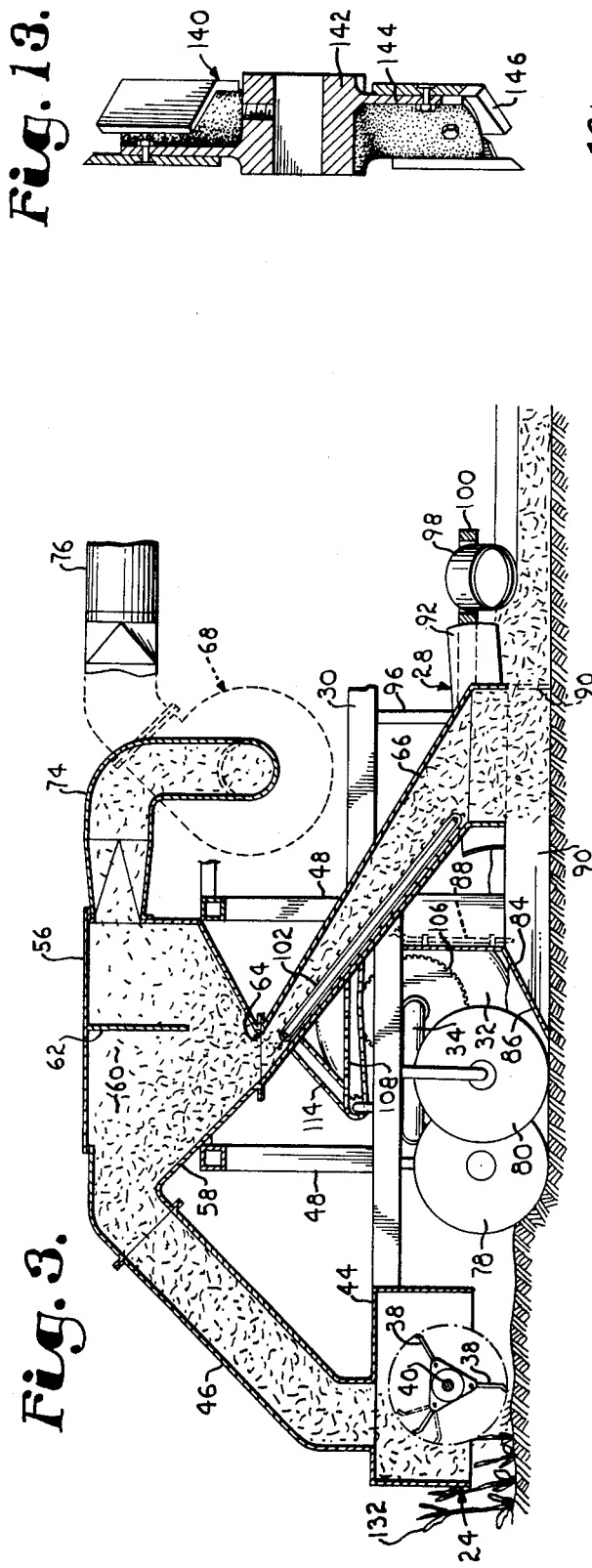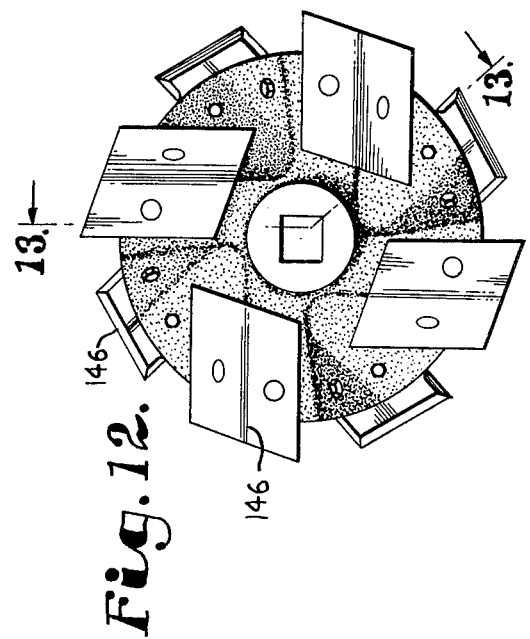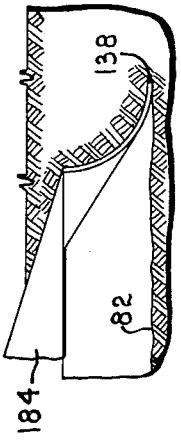

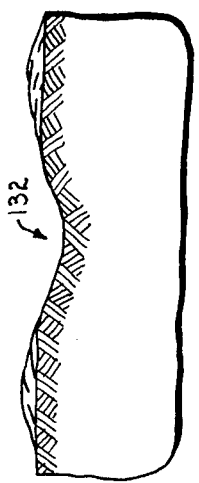
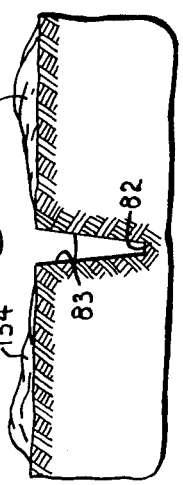
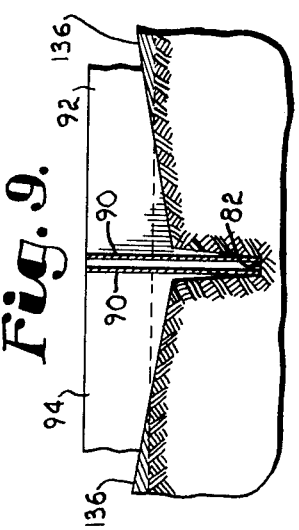
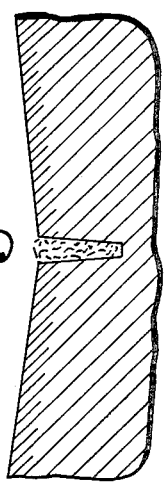
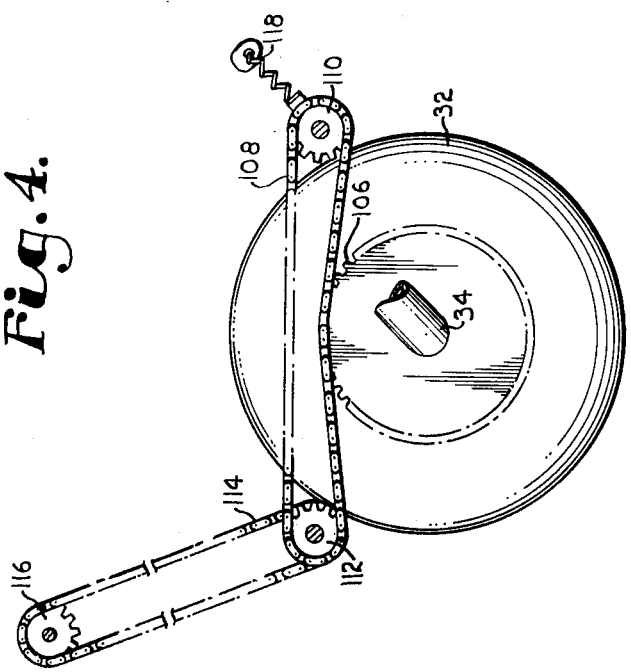
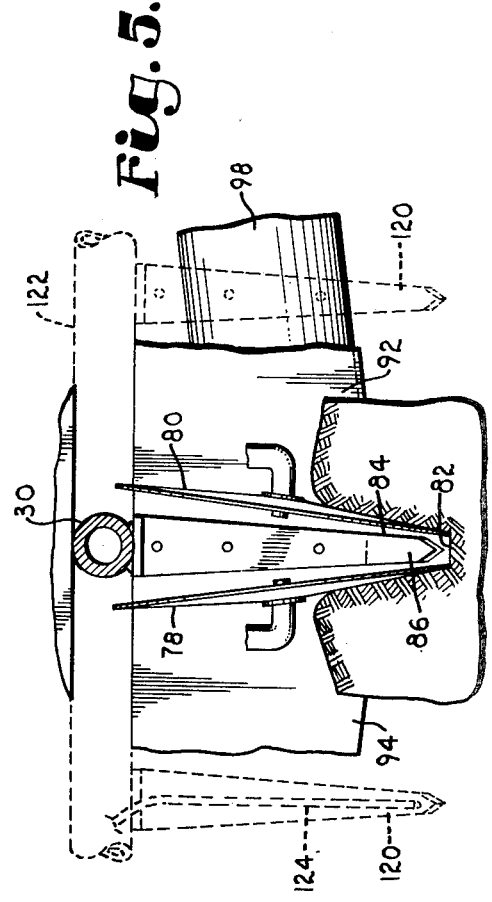

AGRICULTURAL IMPLEMENT

This is a division of application Ser. No. 386,307, filed Aug. 7, 1973, now U.S. Pat. No. 3,880,099 which application was in turn a continuation-in-part of our previous filed application Ser. No. 288,573 entitled AGRICULTURAL IMPLEMENT FOR WATER CONSERVATION, filed Sept. 13, 1972, and now abandoned.

This invention relates generally to water conservation for agricultural purposes, and, more particularly to a method and apparatus for utilizing a prior year's crop residue for moisture conservation purposes.

It is well known that moisture limitations severely restrict the crop growing capabilities of soil. For many years attempts have been made to devise methods to make better use of farming areas that receive a limited amount of rainfall. These methods have included improved seeds and various agrichemicals for improving the crop production of the semiarid land. A farming method for improving water conservation is disclosed in U.S. Pat. No. 3,556,026, which was issued to one of the present coapplicants on Jan. 19, 1971. The present invention relates to apparatus for performing the method disclosed in the referenced patent.

Accordingly, it is one of the primary objects of this invention to provide apparatus to form a longitudinally extending vertical slot and an inclined watershed area adjacent to the slot for drainage of water into the slot where the water is held until needed by growing crops.

Another object of this invention is to provide apparatus as described in the foregoing object wherein is included means for compacting the surface area to minimize water absorption by the area.

A further object of this invention is to provide apparatus for forming a longitudinally extending slot in the soil and preparing a compacted, inclined watershed area extending on either side of the slot, wherein is included apparatus for delivering a mulch material to the slot to retard evaporation of water entering the slot.

As still another corollary to the object second above, an objective of this invention is to provide apparatus as described wherein is included structure for converting stubble from a prior year's crop to mulch material thereby providing an immediately and continuously available supply of mulch material.

It is also an object of the present invention to provide a method and apparatus for removing a crop stubble and separating the relatively high protein content leaf material for use as a feed while returning the stalk material to the field for build up of organic matter in the soil.

As a corollary to the above object, an important aim of the invention is to provide a method and apparatus as described including apparatus for forming a longitudinally extending vertical slot whereby the stalk material can be deposited in the slot to facilitate retention of moisture.

Still another objective of the invention is to provide a method and apparatus for forming a vertically and longitudinally extending slot in a field, which slot is filled with mulch material for moisture retention, and wherein the mulch material comprises stalks from a prior year's crop and decay of organic matter in the slot is minimized by separating the relatively high nitrogen content leaf material from the stalk material.

As a corollary to the above object, it is an objective of the invention to provide a method and apparatus as described wherein shrinkage of material in the slot is minimized as a result of separation of the relatively light and "fluffy" leaf material from the stalk material thus providing for a tighter more compacted filling of the slot.

Still another important object of this invention is to minimize stream pollution from field run-off water by harvesting a prior year's crop stubble and separating the relatively high nitrogen content leaves which are the source of pollution from the stalk material prior to returning the latter to the field.

Still another aim of this invention is to provide a new source of feed for animals by harvesting a prior year's crop stubble and separating the stalk material which is relatively low in food value from the leaf material which is high in food value. In the drawings:

FIG. 1 is a side elevational view of the apparatus of the present invention;

FIG. 2 is a top plan view of the apparatus shown in FIG. 1;

FIG. 3 is a vertical cross-sectional view taken through the apparatus of FIGS. 1 and 2 to reveal details of construction;

FIG. 4 is an enlarged detail view of mechanism for driving a conveyor utilized in conjunction with the apparatus;

FIG. 5 is an enlarged fragmentary front elevational view showing details of one form of slot forming structure and associated soil cultivating means;

FIG. 6 is an enlarged vertical cross-sectional view through a slot as the latter is being formed;

FIG. 7 is a fragmentary, partially diagrammatic vertical cross-sectional view of the field after a first surface working component of the apparatus has passed;

FIG. 8 is a fragmentary, partially diagrammatic vertical cross-sectional view of the field illustrating the configuration of the field as the slotting means passes therethrough;

FIG. 9 is a fragmentary, partially diagrammatic vertical cross-sectional view of the field illustrating the grader blades passing therethrough to complete formation of the watershed area;

FIG. 10 is still another fragmentary, partially diagrammatic vertical cross-sectional view of the field after formation and compacting of the watershed area and filling of the slot with mulch material;

FIG. 11 is a top perspective view of an initial soil working component which may be utilized on an optional basis with the apparatus of the invention;

FIG. 12 is an enlarged side elevational view of an alternative form of slot forming structure; and FIG. 13 is a cross-sectional view taken along line 13—13 of FIG. 12 and showing details of the alternate slot forming means.

Referring initially to FIGS. 1–3, the apparatus of the present invention is designated generally by the numeral 20 and comprises a carrier designated generally 22 which mounts a flail harvester designated generally 24, slot forming structure designated generally by the numeral 26 and watershed forming structure designated generally by the numeral 28. Carrier 22 comprises a generally horizontally disposed platform framework 30 that mounts a pair of ground-engaging wheels 32 on opposite sides of carrier 22. Wheels 32 are mounted on the carrier through a generally U-shaped pivotal shaft 34. Shaft 34 is pivotal about a horizontal axis through an appropriate sized hydraulic cylinder (not shown) so as to raise or lower wheels 32 for either over-the-field or over-the-road travel. A horizontal forwarding extending beam 36 which is rigid with framework 30 provides means for coupling apparatus 20 with a tractor.

Also disposed at the forward end of framework 30 is flail harvester 24 which comprises a series of circumferentially spaced cutting knives or flails 38 secured to a drive shaft 40. Drive shaft 40 is coupled, through appropriate linkage which includes power extension 42, with the power takeoff of the pulling tractor (not shown). While only three flails 38 disposed in circumferentially spaced relationship are visible in FIG. 3, it is to be understood that each of these flails is disposed in alignment with other flails disposed laterally across the width of apparatus 20 so as to be able to cut a swath through a field.

An appropriate housing 44 partially encloses flails 38 and has an opening along its upper side for communication with an upwardly and rearwardly extending material delivery chute 46.

Disposed atop platform 30 and supported by structural standards 48 through 54 is a material separator designated generally by the numeral 56. Separator 56 comprises a housing 58 defining an enclosed chamber 60 in material communication with chute 46. Depending from the upper horizontal wall of housing 58 in a vertical position is a deflector 62 for partially blocking the flow of material through the chamber as will be explained in greater detail hereinafter. An opening 64 at the bottom of housing 58 provides for communication of chamber 60 with a directional chute 66.

Separator 56 also includes a fan designated generally 68. Fan 68 is preferably of the squirrel-cage type with blades 70 enclosed in a housing 72. The fan intake is through a conduit 74 which is in communication with chamber 60 on the side of deflector 62 which is opposite the inlet opening from delivery chute 46. The material pulled through fan 68 is directed through a conduit 76 which is in communication with the outlet side of the fan to a wagon or other storage area (not shown).

The slot forming structure 26 comprises first and second spaced apart rotatable colters 78 and 80 which are mounted in depending relationship to framework 30 behind the flail harvester 24 and ahead of directional chute 66. As best illustrated in FIG. 5, colters 78 and 80 are preferably mounted at a slight angle from the vertical so as to form a slot 82 the sidewalls of which are closer together at the bottom of the slot than at the top of the slot.

Disposed immediately behind and lying along a plane intermediate of colters 78 and 80 is a shoe 84 which extends into the slot and is rigidly mounted with framework 30. Shoe 84 has an upwardly inclined surface 86 disposed at an angle of approximately 30 degrees relative to the horizontal for lifting loosened soil out of the slot. Immediately behind shoe 84 a conduit 88 extends downwardly into the slot for delivering a quantity of fertilizer. As best understood from viewing FIGS. 3 and 9, shoe 84 is rigid with and merges into first and second spaced apart plates 90 which extend rearwardly from the shoe to assure that slot 82 will remain open until material passing through directional chute 66 fills the slot. To this end, the opening at the end of chute 66 communicates with the space between plates 90 to deposit material into the slot.

The watershed forming structure 28 comprises first and second grader blades 92 and 94 that extend outwardly behind and on either side of shoe 84 as best illustrated in FIG. 5. Blades 92 and 94 are rigidly secured with framework 30 through a plurality of depending structural members 96, one of which is visible in FIG. 3. Blades 92 and 94 are preferably disposed so that the angle between them is no greater than 70° to maximize working efficiency. Also, blades 92 and 94 may be tapered as they extend outwardly from a horizontal plane passing through the lowest point at the apex of the V-configuration formed by the blades to provide a desired angle and configuration for a watershed area.

Structure 28 also includes a compactor in the form of rollers 98 disposed in trailing relationship to blades 92 and 94. Each roller 98 is carried by framework 30 through a horizontal support 100 and depending structural members 96. Rollers 98 are preferably disposed so that in the area immediately adjacent slot 82 the lowest most point on the rollers will be above the lowest most point on blades 92 and 94. As the rollers extend outwardly away from the slot, however, they are disposed to extend below the lowest most point on blades 92 and 94.

To facilitate placement of material from chute 66 into slot 82, a conveyor 102 is mounted along one side of the chute. Conveyor 102 is driven by the drive mechanism shown in detail in FIG. 4 and designated generally by the numeral 104. Mechanism 104 comprises a drive sprocket 106 rigid with wheel 32 on the inside of the latter. An endless chain 108 is operably coupled with sprocket 106 and runs around a pair of idler sprockets 110 and 112. The second idler sprocket 112 is keyed to and coaxial with a second sprocket (not shown) around which a second endless chain 114 is trained. Chain 114 also passes over driven sprocket 116, the shaft of which comprises the drive shaft for conveyor 102. A tensioned spring 118 is coupled with the sprocket 110 to exert a biasing force on the latter and maintain the chain taut. This also assures disengagement of the chain with drive sprocket 106 when wheels 108 are lowered for over-the-road travel.

In some instances it may be desirable to cultivate the watershed area prior to final forming and compacting. To this end, a plurality of chisel plows 120 are disposed in front of blades 92 and 94 as illustrated in FIG. 5. Plows 120 are disposed on a horizontal support 122 that is rigid with a section of framework 30. A conduit 124 is disposed behind each of the plows 120 for application of fertilizer or other chemicals in the area being cultivated.

In certain types of soil it is also desirable to employ a middle buster implement of the type shown in FIG. 11 and designated generally by the numeral 124 ahead of the slot forming structure 26. Middle buster 124 is carried by framework 30 and comprises a soil penetrating nose portion 126 which merges into outwardly extending, relatively wide, moldboards 128. Secured to the leading edge of the moldboards are shovels 130 which are disposed to uproot clods of root balls, from a prior year's crop.

In operation, apparatus 20 is transported to a field with wheels 32 fully lowered to keep the soil working implements out of ground engagement. The wheels are raised by a power cylinder, not shown, to lower the implements into their field working position. The stubble 132 from a prior year's crop such as milo or corn consists of relatively heavy and coarse "stalk" material and much lighter and fluffy "leaf" material. It is to be understood that the term leaf material is intended to include all of the material from the stubble having the general characteristics of the leaves as opposed to the stalk. For example, in the case of corn, this would include residual shuck material left in the field subsequent to the corn picking operation.

The stubble is cut by the rotary action of flails 38 which also partially chop and pulverize the material to form a suitable mulch. The force of flails 38 rotating at a high speed is sufficient to thrust the harvested stubble upwardly through chute 46 and into chamber 60. Here the velocity of the material is greatly reduced as it strikes deflector 62 and falls downwardly. Operation of fan 68, which may be powered through belt drives or a gasoline engine, creates an air flow through chamber 60 which pulls the light material such as leaves and shucks upwardly through chamber 60 and into conduit 74. A suitable fan 68 will have an air flow of 6,000 c.f.m. at 6 inches of water column.

Manifestly, the air flow through chamber 60 is adjusted so that the heavier stalk material will gravitate through opening 64 and into directional chute 66. The lighter leaf material is passed to a storage area where it can be retained for subsequent use as an animal feed.

Simultaneously with the harvesting of stubble 132 a longitudinally extending vertical slot and water shed area are being formed in a sequential operation. The sequence is best understood by viewing FIG. 3 along with FIGS. 7–10. Assuming the optional middle buster 124 is utilized as a first surface working tool, it will remove a top layer of soil, for example, 2 to 4 inches, in an area designated by the numeral 132 in FIG. 7 and move this initial quantity of soil outwardly away from the future location of slot 82. Utilization of the middle buster assures that any seed from a prior year's crop will be moved out of the watershed area to be formed adjacent slot 82 so as to prevent volunteer plants in this critical area. Middle buster 124 also reduces the overall power requirements where this is necessary by removing an initial quantity of soil in area 132 thus reducing the quantity of soil through which colters 78 and 80 must pass. Finally, shovels 130 on the leading edges of middle buster 124 are capable of uprooting clods of root balls from a prior year's crop (if any) to allow the moldboards to move these clods outwardly to the top of the watershed area where the clods will form a barrier to reduce wind erosion.

Next, colters 78 and 80 pass through work area 132 and, by a shearing action, form sidewalls 83 of slot 82. By virtue of the fact that the colters are disposed in longitudinally offset relationship, soil build up between them is substantially eliminated. Upon passage of shoe 84 through the sheared soil, the loose soil which has been designated by the numeral 134 in FIG. 8 is lifted upwardly out of the slot and into the path of blades 92 and 94 which complete formation of a watershed area designated by the numeral 136. Blades 92 and 94 extract still a further quantity of soil from immediately adjacent the slot 82 and move this soil outwardly to increase the angle of inclination of area 136. Under certain soil conditions a sufficiently compact watershed area 136 may be formed by the passage of blades 92 and 94 without the need for further surface working. It may also be desirable to terminate the blades 92 and 94 at a point moved inwardly somewhat from the span illustrated in FIG. 2 to cause a mound of dirt to be deposited near the outer edge of area 136. The presence of such a mound is helpful in reducing wind erosion.

The surfaces formed by blades 92 and 94 are further compacted by rollers 98. These rollers desirably exert more compacting force at their ends away from slot 82 than in the area nearer to the slot. That is, loosened soil such as 134 should normally be compacted to a greater degree than the soil immediately adjacent the slot that has not been loosened.

As previously mentioned, it has been found highly desirable to apply fertilizers and herbicides through conduits 88 and 124. Particularly with ammonia, most efficient utilization of the nitrogen in the ammonia occurs when the latter is placed beneath the surface of the soil between slot 82 and a crop row because of the maximum utilization of available water in this area. This is achieved by utilizing conduits 124 for placement of the ammonia. It has also been found highly desirable to apply phosphorous to a field through conduit 88 positioned immediately behind the slot forming apparatus. This phosphorous applied in this location is complexed with the organic matter and the mulch material in a more readily usable form than has heretofore been possible.

It is to be understood, of course, that a crop will normally be planted in rows approximately half way up the watershed areas on either side of the vertical slot. In some cases it may be desirable to employ a furrow opener on the outside ends of each roller 98 for forming an irrigation trench above the row. It has also been found that disposition of a soil ripper in the vicinity of the outermost ends of each of the rollers can be of benefit in cooperating with shovels 130 to form a rough ridge which presents a wind barrier to retard soil erosion.

While the specific dimensions and design criteria for the vertical slot and adjacent watershed area will vary depending upon soil conditions, amount of anticipated rainfall, and the crop to be planted, in general a slot depth of 6 to 10 inches may be utilized with optimum results being obtained with a depth of approximately 7 inches. It is normally desirable to form the slot with a slightly greater width at the top than at the bottom to facilitate placement of the mulch material. The slot width should generally be within the range of from 1½ to 5 inches at the bottom of the slot and from 2½ to 6 inches at the top of the slot. The slope of the watershed areas are normally not greater than 10 to 15 percent from the horizontal. If soil conditions are such that a problem of erosion exists, blades 92 and 94 may be tapered to provide an area having a slope of from 3 to 5 percent immediately adjacent the slots and extending outwardly therefrom for a distance up to 80 percent of the total width of the watershed area, with the remainder of the area sloping at 10 to 15 percent. This outermost area of the watershed will, of course, be subjected to additional compacting as the wheels of carrier 20 pass over it followed by the wheels of a tractor pulling a planting implement.

An alternative form of the invention is illustrated in FIG. 6 of the drawings. Here, a modified shoe 184 is illustrated with a depending curvilinear ripper 138 extending from the leading edge of the shoe. Shoe 184 with attached ripper 138 is disposed within slot 82 in trailing relationship to colters 78 and 80 in the same manner as shoe 84 above described. The shoe 184 with ripper 138 will tear the bottom of slot 82 to increase the available water absorption area. This may be desirable with certain types of soil.

Another alternative form of the invention is illustrated in FIGS. 12 and 13. An alternative slot forming structure comprising a rotary corrugator is designated generally by the numeral 140. Rotary corrugator 140 comprises a sleeve 142 adapted to be mounted upon an appropriate shaft and a plurality of laterally extending brackets 144. These brackets mount cutting knives 146 which are disposed in alternately spaced apart relationship around the periphery of sleeve 142 as best illustrated in FIG. 12. Manifestly, when corrugator 140 is employed in place of colters 78 and 80, a combined cutting and lifting action is achieved. This form of slotting structure is particularly useful with relatively damp soils where colters 78 and 80 would be less suitable. Under certain soil conditions, it may be possible to utilize corrugator 140 to both form slot 82 and throw loosened dirt outwardly away from the slot to an extent so as to simultaneously form watershed area 136.

As will be appreciated by those skilled in the art, after slot 82 and watershed area 136 have been formed during an initial farming operation, it is feasible in subsequent farming years to pass through the field and remove stubble 132 without reforming the slot or the watershed area. To this end, the apparatus of the present invention would be employed to harvest the stubble, separate leaf from stalk material, and return the stalk material to the field for fertilization and erosion prevention purposes while retaining the leaf material for animal feed. The stalk material which is high in cellulose and lignin material is decomposed in the soil to build up soil nutrients. This material is, however, relatively low in nitrogen content and therefore does not contribute appreciably to stream pollution because of water run-off. When the stalk material is utilized to fill slot 82, a much more compact mulch within the slot is possible than with previously available apparatus because of the removal of the leaf material. Decay of the mulch within the slot is also minimized because of the removal of the high nitrogen content leaf material.

Manifestly, the present invention also contemplates a method of working a field in preparation for growing a crop where a prior year's crop stubble comprised of stalk and leaf material is present in the field. The stubble is first removed from the field and the leaf material then separated from the stalk material. The field is preferably cultivated before returning the stalk material to the field and a longitudinally extending vertical slot may be formed for water retention purposes along with an inclined watershed area extending on either side of the slot. The stalk material is then returned to the field by introducing it into the slot while the leaf material is forwarded to a holding area where it may be subsequently utilized for animal feed.

It is also contemplated that in some instances it may be desirable to utilize chamber 60 as a holding area for the heavier stalk material which is to ultimately be passed to slot 82. In this instance, appropriate flow control mechanism would be incorporated into the outlet opening 64 so as to limit the flow of material therethrough. It may also be desirable to increase the size of chamber 60 so that material being held will not interfere with separation of leaf from stalk material in the upper part of the chamber. Such a holding area would find utility where an extremely uneven flow of stubble 132 is encountered and the flow is "evened out" through the utilization of the holding area.

Having described the invention, we claim:

1. Apparatus for use in farming where a crop stubble comprised of leaf material and stalk material is present in the field, said apparatus comprising:
   a carrier adapted for over the field travel;
   a flail chopper for extracting said crop stubble from the field,
   said chopper comprising an upwardly extending material delivery chute for directing said material to a remote location and deflector structure disposed in the path of flow of material traveling through said chute to reduce the velocity of material;
   separator means for receiving the crop stubble and comprising a receiving chamber and means for creating an air flow through the chamber whereby the lighter leaf material will follow the air stream and the heavier stalk material will gravitate out of said chamber;
   first means on the separator means for directing separated stalk material back to the field; and
   second means on the separator means for directing separated leaf material to a storage area.

2. A method of working a field in preparation for growing a crop wherein a prior year's crop stubble comprising stalk material and leaf material is present in the field, said method comprising the steps of:
   removing the stubble from the field;
   separating the leaf material from the stalk material;
   returning the stalk material to the field; and
   forwarding the leaf material to a holding area.

3. A method as set forth in claim 2, wherein is included the step of cultivating the field prior to said returning step.

4. A method as set forth in claim 2, wherein is included the step of forming a longitudinally extending slot in the field prior to said returning step, and wherein said returning step comprises returning the stalk material to said slot.

5. A method as set forth in claim 4, wherein is included, prior to said returning step, the step of forming an inclined watershed surface area extending upwardly from either side of said slot for directing water runoff into the slot.

6. An agricultural implement for use in a field having plant stubble therein comprising leaf material and stalk material, said implement comprising:
   carrier means adapted for over the field travel;
   harvesting means coupled with said carrier for harvesting stubble,
   said harvesting means comprising means for separating the leaf and stalk material;
   slotting means depending from said carrier for forming a slot in the field as the carrier is advanced; and
   means carried by the carrier for receiving the separated stalk material and for directing said stalk material in the slot.

7. The invention of claim 6, wherein the leaf and stalk separating means comprises a separating chamber, and means in communication with the chamber for creating air flow therethrough whereby the lighter material will move with the air stream and the heavier material will gravitate from said chamber.

8. The invention of claim 7, wherein said harvesting means comprise a flail chopper provided with an upwardly extending material delivery chute, said chute being in material delivery communication with said chamber.

9. The invention of claim 6, wherein is included surface working means disposed on said carrier for forming an inclined watershed surface area extending upwardly on either side of said slot.

10. The invention of claim 9, wherein said surface working means comprises first and second angularly disposed grader blades for moving a quantity of soil outwardly away from the slot upon movement of the carrier through the field, and means disposed in trailing relationship to said grader blades for compacting the soil over which said blades have passed.

11. The invention of claim 9, wherein said surface working means comprises a first surface working member disposed forwardly of said slotting means and adapted to remove an initial quantity of the soil along a line disposed in alignment with the slot to be formed; a second surface working member disposed in trailing relationship to said slotting means for finishing said area; and a compacter disposed in trailing relationship to said second member.

12. An agricultural implement for use in a field having plant stubble therein comprising:
 a carrier adapted for over the field travel;
 means depending from said carrier for shearing the soil at spaced apart locations to form the sides of a slot;
 surface working means depending from said carrier for forming an inclined watershed surface area extending upwardly from either side of said slot;
 means carried by the carrier for placing a mulch material in the slot, whereby water will run down said area into the slot and said material will retard evaporation in the slot; and
 harvesting means coupled with said carrier for harvesting the stubble, converting the same to a mulch material, and delivering the material to said mulch placing means.

* * * * *